United States Patent
Ailaney et al.

(10) Patent No.: US 8,731,532 B2
(45) Date of Patent: May 20, 2014

(54) METHOD FOR DELIVERING ELECTRONIC DOCUMENTS USING MOBILE TELEPHONY IDENTIFIERS IN A SECURE MANNER IN CONJUNCTION WITH INTERNET PROTOCOLS AND ADDRESS SYSTEMS

(71) Applicants: Manjesh Singh Ailaney, Fremont, CA (US); Gerald Dan Hutcheson, Palo Alto, CA (US)

(72) Inventors: Manjesh Singh Ailaney, Fremont, CA (US); Gerald Dan Hutcheson, Palo Alto, CA (US)

(73) Assignee: VLSI Research, Inc., Santa Clara, CA (US)

( * ) Notice: Subject to any disclaimer, the term of this patent is extended or adjusted under 35 U.S.C. 154(b) by 0 days.

(21) Appl. No.: 13/649,056

(22) Filed: Oct. 10, 2012

(65) Prior Publication Data
US 2014/0099919 A1   Apr. 10, 2014

(51) Int. Cl.
H04M 3/42   (2006.01)
H04W 4/00   (2009.01)

(52) U.S. Cl.
USPC ......... 455/415; 455/466; 455/412.1; 455/413

(58) Field of Classification Search
USPC ................................ 455/410, 415; 709/206
See application file for complete search history.

(56) References Cited

U.S. PATENT DOCUMENTS

| | | | |
|---|---|---|---|
| 6,449,718 B1 | 9/2002 | Rucklidge et al. | |
| 6,662,218 B2 | 12/2003 | Mighdoll et al. | |
| 8,112,361 B2 | 2/2012 | Golan et al. | |
| 8,213,909 B2 * | 7/2012 | Lee et al. | 455/413 |
| 8,230,037 B2 | 7/2012 | Story et al. | |
| 2002/0107759 A1 | 8/2002 | An | |
| 2003/0028432 A1 | 2/2003 | Troyansky et al. | |
| 2008/0249942 A1 | 10/2008 | Barrs et al. | |
| 2009/0157823 A1 * | 6/2009 | Price, III | 709/206 |
| 2010/0325213 A1 * | 12/2010 | Harris, III | 709/206 |
| 2011/0159861 A1 * | 6/2011 | Pratt et al. | 455/417 |
| 2012/0011001 A1 | 1/2012 | Gross et al. | |

OTHER PUBLICATIONS

"AmazonKindle User's Guide." amazon.com. Amazon.com, Inc., Web. 2004-2012. <http://kindle.s3.amazonews.com/Kindle_User%27s_Guide_English.pdf>.
"Apple iBooks Chapter 16: iBooks for the iPad." Apple.com. Apple, Inc., Web. 2010 <http:/manuals.info.apple.com/en_US/iPad_iOs4_User_Guide.pdf>.
"Why you should use SlideShare?" SlideShare: Present Yourself. SlideShare, Inc., Web. 2011. website: <http://www.slideshare.net/about>.
"Not Yet on SlideShare?" SlideShare: Present Yourself. SlideShare, Inc., Web. 2011. website: <http://www.slideshare.net/about>.

* cited by examiner

*Primary Examiner* — George Eng
*Assistant Examiner* — Joseph Dean, Jr.
(74) *Attorney, Agent, or Firm* — Carr & Ferrell LLP (57) ABSTRACT

Systems, methods, and media for delivering electronic documents using mobile telephony identifiers, such as IMEI, in a secure manner in conjunction with Internet protocols and address systems are provided herein. According to some embodiments, exemplary methods may include receiving a communication, determining a hybrid endpoint identifier associated with a communications device by evaluating the communication for either the hybrid endpoint identifier or routing information, the hybrid endpoint identifier comprising an identifier appended to a telephone number, and routing the communication to the communications device via a telephony network based upon the hybrid endpoint identifier.

13 Claims, 4 Drawing Sheets

METHOD FOR DELIVERING ELECTRONIC DOCUMENTS USING MOBILE TELEPHONY IDENTIFIERS IN A SECURE MANNER IN CONJUNCTION WITH INTERNET PROTOCOLS AND ADDRESS SYSTEMS

FIELD OF THE INVENTION

The present technology may be generally described as providing systems and methods for delivering communications over inherently more secure telephony networks. More specifically, but not by way of limitation, the present technology may facilitate the delivery of communications such as e-mails etc. via wireless and/or wired telecommunications systems (telephony networks) using hybrid endpoint identifiers associated with communications devices. Such hybrid endpoint identifiers may comprise a unique identifier that is appended to a telephone number. Thus, communications such as e-mails etc. may be transmitted using endpoint-to-endpoint telephony networks, in addition to, or in place of, delivery via conventional or legacy e-mail systems.

BACKGROUND

The delivery of communications such as e-mails etc. commonly encompasses the use of e-mail clients (e.g., programs) that communicate with legacy e-mail servers via a network, such as the Internet. Methods for sending and receiving e-mails can often require a complex lookup process where the e-mail client connects to the Internet and attempts to connect with various incoming and outgoing mail servers. During the communication of e-mails across the Internet, the e-mails may be required to pass through various hops before arrival at their final destination. Each time an e-mail message is dropped at a hop, the potential exists for hacking or theft of the message. Additionally, security measures such as encryption are difficult to manage with e-mail communications.

SUMMARY OF THE PRESENT TECHNOLOGY

According to some embodiments, the present technology may be directed to methods that comprise: (a) assigning a hybrid endpoint identifier to a communications device, the hybrid endpoint identifier comprising an identifier appended to a telephone number, the hybrid endpoint identifier allowing delivery of communications to the communications device via a telephony network; and (b) storing the hybrid endpoint identifier in a user record which resides in a data store.

According to various embodiments, the present technology may be directed to methods for transmitting communications in a secure manner. The methods may comprise: (a) receiving a communication; (b) determining a hybrid endpoint identifier associated with a communications device by evaluating the communication for either the hybrid endpoint identifier or routing information, the hybrid endpoint identifier comprising an identifier appended to a telephone number; and (c) routing the communication to the communications device via a telephony network based upon the hybrid endpoint identifier.

According to exemplary embodiments, the present technology may be directed to systems for transmitting communications in a secure manner. These systems may comprise: (a) at least one server comprising: (i) a memory that includes executable instructions; and (ii) a processor executing the instructions, the instructions comprising: (1) a communications management module that: (A) determines a hybrid endpoint identifier associated with a communications device by evaluating a received communication for either the hybrid endpoint identifier or routing information, the hybrid endpoint identifier comprising an identifier appended to a telephone number; and (B) routes the message to the communications device based upon the hybrid endpoint identifier.

According to other embodiments, the present technology may be directed to a non-transitory machine-readable storage medium having embodied thereon a program. In some embodiments the program may be executed by a machine to perform a method for transmitting communications in a secure manner that comprises: (a) receiving a communication; (b) determining a hybrid endpoint identifier associated with a communications device by evaluating the communication for either the hybrid endpoint identifier or routing information, the hybrid endpoint identifier comprising an identifier appended to a telephone number; and (c) routing the communication to the communications device via a telephony network based upon the hybrid endpoint identifier.

According to various embodiments, the present technology may be directed to methods for transmitting communications in a secure manner. The method may comprise: (a) receiving a communication addressed to a legacy e-mail address; (b) determining a hybrid endpoint identifier which has been mapped to the legacy e-mail address, the hybrid endpoint identifier comprising an identifier appended to a telephone number, the hybrid endpoint identifier being associated with a communications device; and (c) routing the communication to the communications device via a telephony network based upon the hybrid endpoint identifier.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to systems and methods for delivering communications in a secure manner. More specifically, but not by limitation, the present technology allows for delivery (e.g., sending and receiving) of communications that are traditionally transmitted via the Internet, using telephony networks. Exemplary telephony networks that may be utilized in accordance with the present technology comprise, but are not limited to, cellular networks, conventional telephone networks, and so forth.

As mentioned supra, security measures are difficult to manage with legacy e-mail communications. This may be because servers (e.g., DNS servers, routing/waypoint servers, e-mail servers, and so forth) along the network path copy and archives these messages. Furthermore, when a server along the network path is unavailable, the e-mail message may be bounced back to the sender as undeliverable. This problem is compounded when the e-mail message is divided into packets and the packets are sent to a mail server using multiple network paths.

The present technology proffers a unique standard for addressing communications to communications devices. More specifically, communications may be delivered to communications devices using telephony networks. Initially, communications devices may register for, or be assigned, a hybrid endpoint identifier.

The use of a telephony network to deliver communications, such as email communications, is desirable because of the inherent and well developed secure aspects of telephony networks, especially relative to legacy email communications delivery methods. Telephony networks provide point-to-point communication between devices, as opposed to networks that packetize and route communications over the Internet.

Generally, the hybrid endpoint identifier may be created by appending a unique identifier to a telephone number. For example, the hybrid endpoint identifier may comprise name@phonenumber (e.g., johndoe@5555555555). The hybrid endpoint identifier may be associated with a particular communications device using one or more of the many unique hardware or device identifiers that are commonly associated with communications devices such as an international mobile equipment identity (IMEI), a media access control address (MAC), a personal identification number (PIN), a serial number, an international mobile subscriber identity (IMSCI), a mobile equipment identifier (MEI), and an integrated circuit card ID (ICCID).

The unique identifier may be associated with a unique individual. The phone number may provide address related information that links to the cellular account of the end user. Because cellular phone numbers can be ported from service provider to service provider, and from one communications device to another, the tying of a hardware identifier to the hybrid endpoint identifier is advantageous for delivered point-to-point communications. In sum, the combination of the hybrid endpoint identifier and the hardware identifier may be used to deliver communications to the communications device, via a telephony network.

It will be understood that delivering communications to communications devices via a telephony network using the hybrid endpoint identifier provides unique advantages to the delivery of communications, for example e-mail communications, which are traditionally exchanged via e-mail clients and e-mail servers. These and other advantages of the present technology are described in greater detail below with reference to the drawings.

Figure 1:
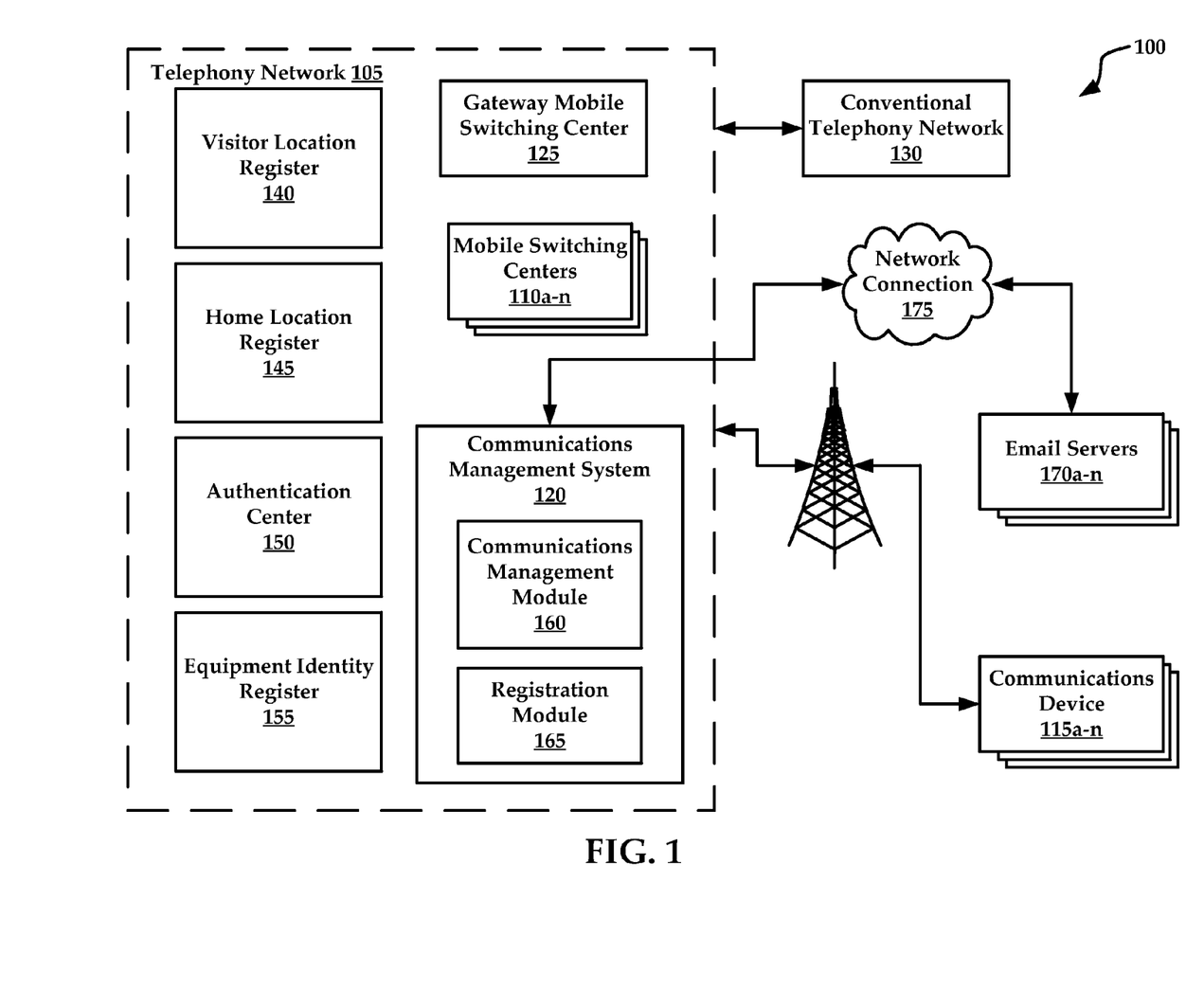
FIG. 1 is a block diagram of an exemplary architecture in which embodiments according to the present technology may be practiced.

Referring now to the drawings and more particularly to FIG. 1, an exemplary architecture 100 that may be utilized to implement embodiments according to the present invention is shown. In some embodiments, architecture 100 may be broadly described as including a telephony network 105 having a plurality of mobile switching centers 110a-n adapted to facilitate communication between one or more communications devices 115a-n, as well as between the communications devices 115a-n via a communications management system 120.

While the communications management system 120 is shown as being associated with the telephony network 105, it will be understood that the communications management system 120 may be implemented on a computing system, such as a web server that is separate from the telephony network 105.

According to some embodiments, communications devices 115a-n may include any number of telecommunications devices capable of utilizing a telephony connection for end-to-end communications. Exemplary devices comprise cellular telephones, wireline phones, personal digital assistance, gaming platforms, smart cameras, public data entry terminals, automated teller machines, computing systems, and the like.

According to some embodiments, telephony network 105 includes at least one of a global system for mobile communications (GSM network), a code division multiple access network (CDMA network), or other mobile phone standard networks such as EDGE, UMTS/UTRA, HSPA, 4G, 4G LTE, and the like. More specifically, in some embodiments, a telephony network 105 may include mobile switching centers 110a-n that are operatively coupled to a gateway mobile switching center 125, which is in turn operatively coupled to a conventional telephony network 130.

Mobile switching centers 110a-n may be the primary nodes of telephony network 105 and may route communications such as cellular telephone calls, SMS (often handled by an SMSC), and the like received from the communications devices 115a-n. It will be understood that mobile switching centers 110a-n are configured to establish end-to-end communications between, for example, two or more communications devices 115a-n. Mobile switching centers 110a-n may also be adapted to communicate with visitor location register (VLR) 140, which includes information indicative of one or more communications devices 115a-n (e.g., an LAI or Local Area Identity) in communication with the mobile switching centers 110a-n. Although not shown, mobile switching center 110a-n may also include a base transceiver adapted to facilitate signaling between communications devices 115a-n and telephony network 105.

Gateway mobile switching center 125 may be a particular type of mobile switching center that may determine the location of mobile switching centers 110a-n currently communicating with communications devices 115a-n. The gateway mobile switching center 125 may communicate with the conventional telephony network 130. The conventional telephony network 130 is a global circuit-switched telephone network adapted to allow any type of telecommunications device (e.g., mobile phone, fixed line telephones, and the like) to communicate with any other telecommunications device, regardless of the telecommunications medium utilized by the telecommunications device, such as fiber optic cables, microwave transmission links, cellular networks, communications satellites, undersea telephone cables, and the like. It will be understood that at least a portion of conventional telephony network 130 may be cloud based and reside on one or more switching servers (not shown) located remotely from telephony network 105.

Both mobile switching centers 110a-n and the gateway mobile switching center 125 are operatively connected to home location register 145 (HLR) that may include information indicative of the communications devices 115a-n having access to telephony network 105. Information indicative of communications devices 115a-n includes SIM card (subscriber identity module) information for each communications device 115. SIM card information may be authenticated by authentication center 150 (AUC). Additionally, authentication center 150 may be operatively connected to equipment identity register 155 that includes information indicative of the hardware of communications device 115a-n such as an international mobile equipment identity (IMEI), a media access control address (MAC), a personal identification number (PIN), a serial number, an international mobile subscriber identity (IMSCI), a mobile equipment identifier (MEI), and an integrated circuit card ID (ICCID)—just to name a few.

Additionally, visitor location registers 140 and home location registers 145 may be modified to include hybrid endpoint identifier tables that include information indicative of address and/or routing information for hybrid endpoint identifiers associated with the communications devices 115a-n.

According to some embodiments, the communications management system 120 may comprise a webserver that includes executable instructions that are stored in memory of the webserver. In some instances the executable instructions may comprise a communications management module 160 and a registration module 165. It is noteworthy that the executable instructions may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules may include separately configured web servers. Also, the modules may be provisioned with a cloud.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user. Thus, with regard to aspects of the present disclosure, the workloads may comprise the analysis of web session data as well as the detection of fraud from such analyzed web session data.

Generally speaking, the communications management system 120 may be described as a system for transmitting communications in a secure manner. Prior to transmitting (e.g., sending and/or receiving) communications, the registration module 165 may be executed to register and/or assign a hybrid endpoint identifier to a communications device. The assignment of a hybrid endpoint identifier to a communications device may comprise an end user requesting a hybrid endpoint identifier, or the automatic assignment of a hybrid endpoint identifier to the communications device from a service provider.

Again, the hybrid endpoint identifier is a combination of a unique identification and a telephone number that can be utilized to deliver communications to a communications device via a telephony network. An exemplary hybrid endpoint identifier may include a unique identifier [johndoe] and a telephone number [5555555555]. The telephone number may have any numbering convention commonly utilized for domestic and/or international use. Additionally, the telephone number may comprise a short or abbreviated dialing code. The hybrid endpoint identifier may be constructed by appending the unique identifier to the telephone number using an arbitrary symbol. For the purposes of end user familiarity, the atmark '@' may be utilized. Again, the hybrid endpoint identifier may be associated with a communications device via one or more device or hardware identifiers.

As mentioned previously, multiple unique identifiers may be associable with a single telephone number. For example, the unique identifiers of johndoe and janedoe may be associated with the same telephone number. Therefore, communications may be generally addressed to the same communications device via the telephone number, but specifically addressed to each of the end users separately via the unique identifiers. A client program, similar to a legacy e-mail client, executing on the communications device may process the communications as they are received and direct the communications to individual inboxes for each end user, based upon the unique identifiers. Conceptually, the telephone number acts as a physical address and the unique identifiers would refer to residents at the physical address. Thus, while messages may be delivered to the same physical address, the unique identifier ensures that the messages can be routed to the appropriate recipient.

According to some embodiments, the hybrid endpoint identifier may be stored by the registration module 165 in a record that resides in a content repository (e.g., database). The content repository may be integral to the communications management system 120 or may be accessible to the communications management system 120. These records may also comprise additional information such as account numbers, username, password, and so forth. Additionally, the hybrid endpoint identifiers may be stored in the VLR 140 and/or the HLR 145, as the hybrid endpoint identifiers are encountered by the telephony network 105.

End users may compose communications such as e-mails using a client-side program that operates similarly to a legacy e-mail client. Rather than addressing the e-mail to a recipient using name@domain.com, the end user may address the communication to a recipient using the hybrid endpoint identifier.

In one exemplary method of operation, two communications devices may engage in end-to-end communication via a telephony network using the communications management system 120. It will be assumed that each of these devices has been assigned a hybrid endpoint identifier as described herein. Further, the communications exchanged by these communications devices may comprise e-mail communications.

When the communications management module 160 receives an e-mail from the client-side application, the communications management module 160 parses the e-mail for a hybrid endpoint identifier. If no hybrid endpoint identifier is detected, the communications management module 160 may pass the e-mail message to legacy e-mail servers 170a-n, via a network connection 175, such as the Internet. This may be advantageous when the communications management module 160 detects a legacy e-mail address (e.g., routing information) in the communications.

If a hybrid endpoint identifier is determined, the communications management module 160 routes or delivers the communication to the desired recipient by way of the hybrid endpoint identifier. It will be understood that if the communications management module 160 is part of a standalone communications management system 120, the communications management module 160 may route the communications to a telephony network (e.g., cellular or conventional telephony) for delivery. If the communications management module 160 is integrated into the cellular network, the communications management module 160 may, in some embodiments, need only to deliver the communication to the recipient according to the hybrid endpoint identifier.

Additionally, the communications management module 160 may deliver the communication over a TCP/IP connection to the communications device using a media access control number for the communications device when the cellular network is unavailable. For example, assuming the communications device is equipped to transmit or receive communications via a TCP/IP connection, if a breakdown in cellular communications is detected by the communications management module 160, the communications management module 160 may attempt to deliver the communications to the end user via a TCP/IP connection. The breakdown in cellular communications may include, for example, inadequate cellphone reception, a malfunction within the cellular network, and so forth. The delivery of communications via a TCP/IP connection may be facilitated over a wired or wireless network path.

In another exemplary embodiment, e-mail communications that are directed to a legacy e-mail address may be routed to a communications device using a hybrid endpoint identifier. To these ends, a hybrid endpoint identifier may be associated with or mapped to a legacy e-mail address. Prior to the delivery of communications an end user may list their hybrid endpoint identifier for their communications device in a DNS record or in a table accessible by a legacy e-mail server. The hybrid endpoint identifier may be listed in a DNS record, CPanel entry, or simply in a lookup table that is accessed by the DNS server or one or more of the e-mail servers 170a-n. When delivery of an e-mail communication is attempted, the DNS server may determine that the hybrid endpoint identifier has been associated with the e-mail address of the recipient. Rather than delivering the e-mail to an e-mail server, the DNS server may redirect the communication to an exemplary communications management system 120 for delivery via a telephony network.

It will be understood that delivery of communications via telephony networks is inherently more secure than delivery of communications via legacy e-mail delivery methods which involve transmitting e-mail packets over a network path between e-mail clients and e-mail servers due to well established laws and legal precedents that protect privacy. In contrast with delivering e-mail packets over the Internet, which may require dropping on various waypoint servers, DNS servers, and/or e-mail servers (collectively referred to as "hops") along the network path, communications delivered over telephony networks are delivered intact and from endpoint-to-endpoint. Though telephony networks utilize switches, repeaters, and so forth, communications transmitted over a telephony network remain intact from sender to recipient. In contrast, e-mail messages transmitted over the Internet may be packetized. Each packet of the e-mail message may traverse a different network path on its way to the destination e-mail server. Such packetization of e-mail messages only increases the likelihood that the e-mail messages can be hacked or otherwise deleteriously affected by network latency, downtime, malware, or fraud.

Additionally, security for e-mail communications can be overly complex because servers along the various network paths may not recognize the particular encryption method used to encrypt the e-mail message. Indeed, decryption of the e-mail message by the destination e-mail server may also be problematic.

Contrastingly, security protocols used in telephony communications are typically more uniform and secure than security measures utilized in Internet-based e-mail communications. In sum, e-mail messages sent using the aforementioned methods of the present technology (e.g., via telephony networks) may be sent via secure and/or unsecure methods. Moreover, the security measures utilized in telephony networks are superior to or provide more uniform and acceptable methods for securing communications relative to communications that occur over the Internet.

Figure 2:
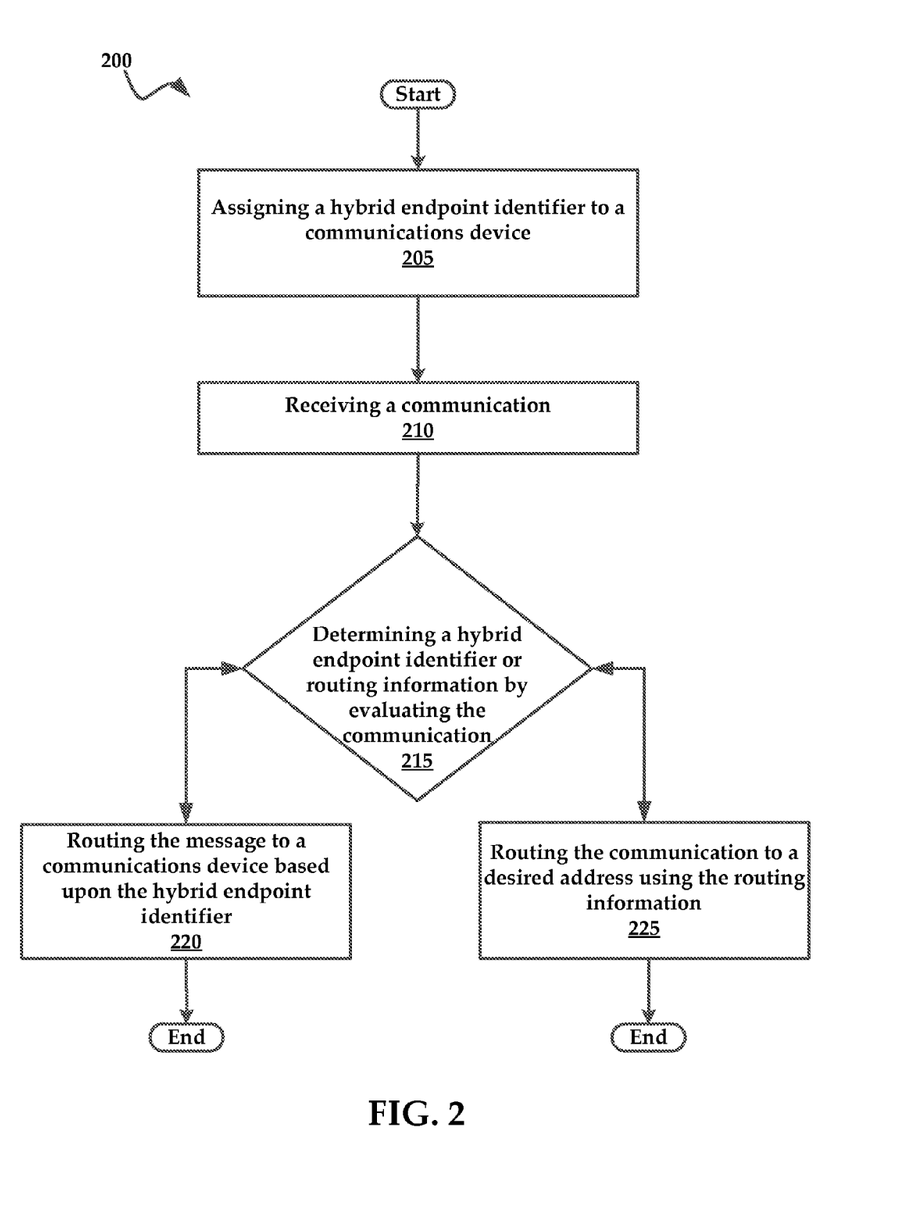
FIG. 2 is a flowchart of an exemplary method for transmitting communications in a secure manner.

FIG. 2 is a flowchart of an exemplary method 200 for transmitting communications in a secure manner. Additionally, this method may be utilized to send communications using insecure or unprotected methods. For example, email messages may or may not be encrypted prior to transmitting the email messages over the telephony network. The method may comprise a step 205 of assigning a hybrid endpoint identifier to a communications device. It will be understood that the hybrid endpoint identifier may comprise an identifier appended to a telephone number. Additionally, the hybrid endpoint identifier may be used wherein the communication is delivered to the communications device via a telephony network, such as e-mail messages.

The method 200 may also comprise a step 210 of receiving a communication, such as an e-mail message. With regard to this exemplary method, the communication may include a hybrid endpoint identifier. Next, the method 200 may comprise a step 215 of determining the hybrid endpoint identifier or routing information by evaluating the communication. Typically, the hybrid endpoint identifier will be included in the communication as the 'TO' address.

If the communications comprises a hybrid endpoint identifier, the method 200 may comprise a step 220 of routing the message to a communications device based upon the hybrid endpoint identifier. In the alternative, if the communication includes routing information such as an IP address or domain name associated with an e-mail server, the method 200 may comprise a step 225 of routing the communication to a desired address using the routing information, such as with the delivery of a legacy e-mail message.

Figure 3:
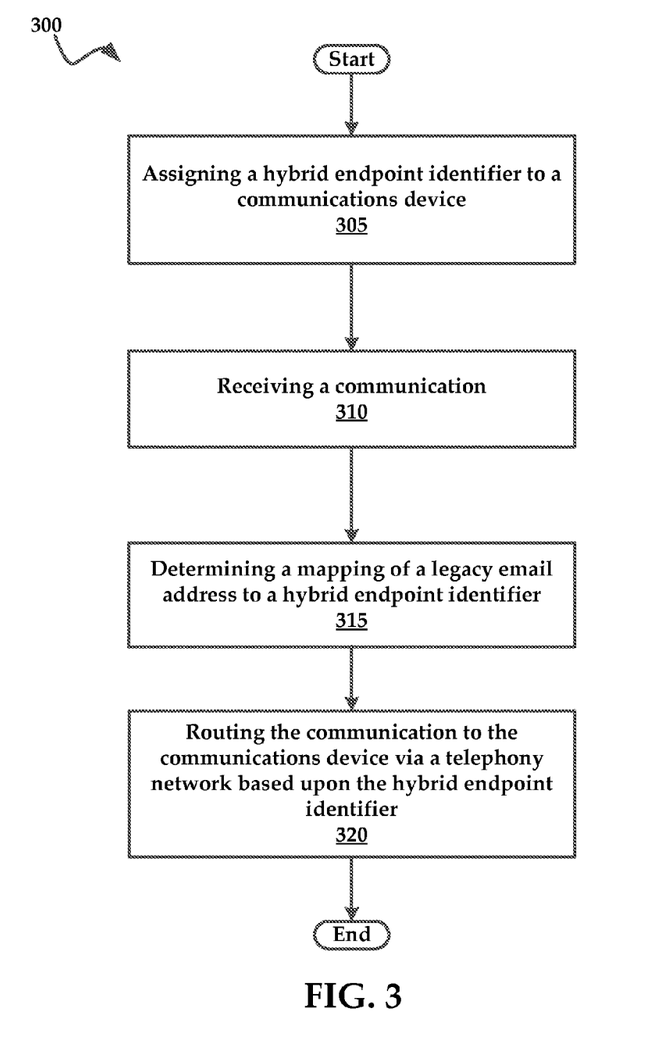
FIG. 3 is a flowchart of another exemplary method for transmitting communications in a secure manner.

FIG. 3 is a flowchart of another exemplary method 300 for transmitting communications in a secure manner. The method 300 is similar to the method 200 of FIG. 2, with the exception that the communication is addressed to a legacy e-mail address such as name@domain.com. Thus, in addition to the steps 305 and 310 of assigning a hybrid endpoint identifier and receiving a communication, the method 300 may comprise a step 315 of determining a mapping of a legacy e-mail address to a hybrid endpoint identifier. The mapping may be included in a DNS record, a table, or other record. The mapping may be determined by a web server such as a DNS server or an e-mail server. Once the mapping has been determined, the method 300 may comprise a step 320 of routing the communication to the communications device via a telephony network based upon the hybrid endpoint identifier.

Figure 4:
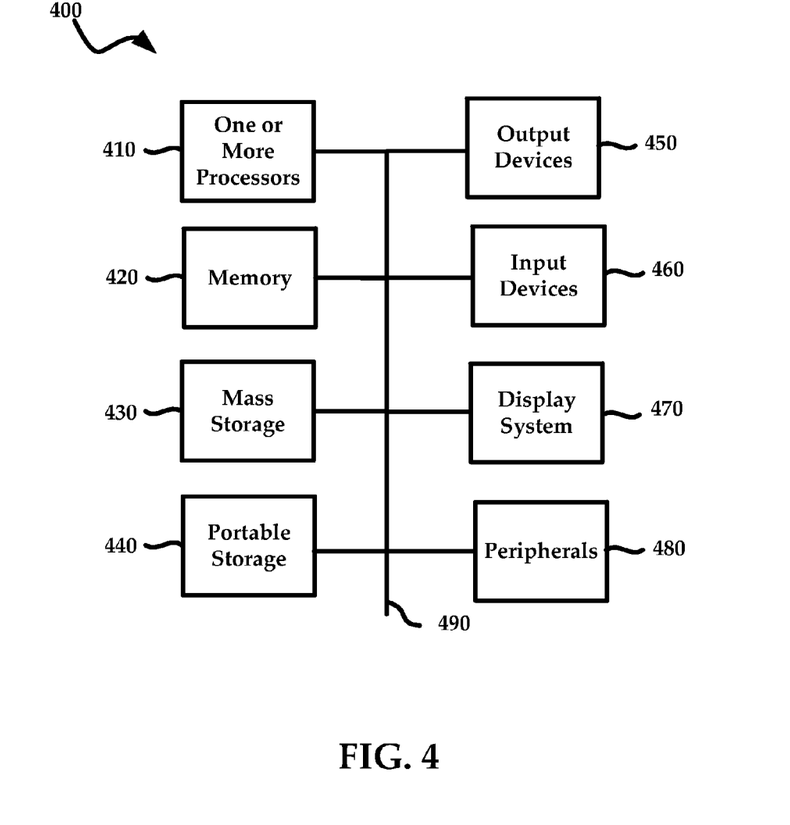
FIG. 4 illustrates an exemplary computing system that may be used to implement embodiments according to the present technology.

FIG. 4 illustrates an exemplary computing system 400 that may be used to implement an embodiment of the present technology. The computing system 400 of FIG. 4 includes one or more processors 410 and memory 420. Memory 420 stores, in part, instructions and data for execution by one or more processors 410. Memory 420 can store the executable code when the computing system 400 is in operation. The computing system 400 of FIG. 4 may further include a mass storage device 430, portable storage devices 440, output devices 450, input devices 460, a display system 470, and other peripherals 480.

The components shown in FIG. 4 are depicted as being connected via a single bus 490. The components may be connected through one or more data transport means. One or more processors unit 410 and memory 420 may be connected via a local microprocessor bus, and the mass storage device 430, peripherals 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by one or more processors 410. Mass storage device 430 can store the system software for implementing embodiments of the present technology for purposes of loading that software into memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys, or other input devices that use haptic (touch), motion, eye movement, audio, or voice recognition. Additionally, the computing system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripherals 480 may include a scanner, printer, fax, modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, flash memory, solid state disk drives, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:

assigning a first and second hybrid endpoint identifier to a communications device, the communications device having a device telephone number and being capable of identifying a first and a second recipient inbox at the device telephone number based on a first and second recipient identifier, respectively, the first hybrid endpoint identifier comprising the first recipient identifier appended to the device telephone number, and the second hybrid endpoint identifier comprising the second recipient identifier appended to the device telephone number, the first hybrid endpoint identifier allowing delivery of a first communication to the first recipient inbox at the communications device via a telephony network, and the second hybrid endpoint identifier allowing delivery of a second communication to the second recipient inbox at the communications device via the telephony network;

storing the first and second hybrid endpoint identifiers in a user record which resides in a data store;

receiving the first communication and the first hybrid endpoint identifier from a sender for the first recipient inbox; and transmitting the first communication to the communications device via the telephony network using the device telephone number, the first communication including the first recipient identifier to allow the communications device to identify the first recipient inbox for routing the first communication to the first recipient inbox.

2. The method according to claim 1, further comprising associating the first and second hybrid endpoint identifier with the communications device by associating the first and second hybrid endpoint identifier with a device identifier of the communications device.

3. The method according to claim 2, wherein the device identifier comprises any of an international mobile equipment identity, a media access control, a personal identification number, a serial number, an international mobile subscriber identity, a mobile equipment identifier, and an integrated circuit card ID.

4. The method according to claim 1, wherein the hybrid endpoint identifier comprises an "@" symbol inserted between the identifier and the device telephone number.

5. The method according to claim 1, further comprising:

receiving the second communication and the second hybrid endpoint identifier for the second recipient inbox from the same or another sender; and transmitting the second communication to the communications device via the telephony network using the device telephone number, the second communication including the second recipient identifier to allow the communications device to identify the second recipient inbox for routing the second communication to the second recipient inbox.

6. The method according to claim 1, wherein the communication is delivered to the communications device via a cellular network.

7. The method according to claim 6, wherein routing the communication further comprises delivering the communication over a TCP/IP connection to the communications device using a media access control number for the communications device when the telephony network is unavailable.

8. The method according to claim 1, wherein the communication comprises an e-mail message generally addressed to the communications device via the telephone number and specifically addressed to an inbox of the recipient via the recipient identifier.

9. The method according to claim 8, further comprising encrypting the e-mail message using an encryption protocol.

10. The method according to claim 1, wherein routing information comprises an address associated with a domain name server or an e-mail server.

11. The method according to claim 10, wherein determining a hybrid endpoint identifier associated with a communications device comprises executing a lookup of a DNS record associated with the domain name server to determine a hybrid endpoint identifier included in the DNS record.

12. The method according to claim 1, wherein the communication comprises an e-mail message and a communications management module encrypts the e-mail message using an encryption protocol.

13. The method according to claim 1, further comprising:

receiving a second communication and the second hybrid endpoint identifier from a sender for the second recipient inbox; and transmitting the second communication and the second recipient identifier to the communications device via the telephony network using the device telephone number, the second communication including the second recipient identifier to allow the communications device to identify the second recipient inbox for routing the second communication to the second recipient inbox.

* * * * *